April 7, 1970　　　　M. J. LUCKEY　　　　3,505,022
METHOD AND APPARATUS FOR DETERMINING INTOXICATION
Filed May 5, 1969
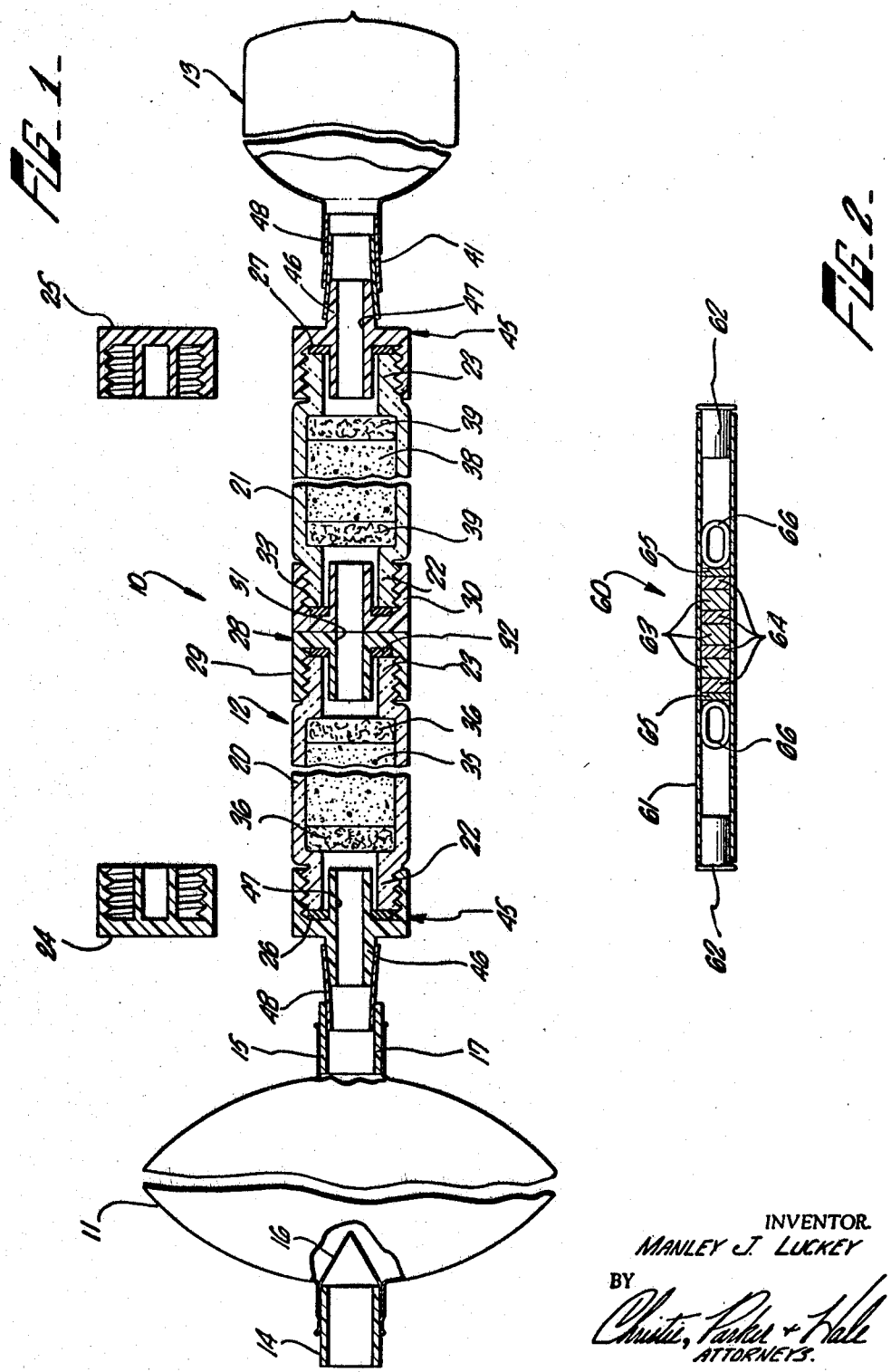
INVENTOR.
MANLEY J. LUCKEY
BY
Christie, Parker + Hale
ATTORNEYS.

United States Patent Office

3,505,022
Patented Apr. 7, 1970

1

3,505,022
METHOD AND APPARATUS FOR
DETERMINING INTOXICATION
Manley J. Luckey, 1738 N. Waterman Ave.,
San Bernardino, Calif. 92404
Continuation-in-part of application Ser. No. 416,540,
Dec. 7, 1964. This application May 5, 1969, Ser.
No. 821,865
Int. Cl. G01n 31/06, 31/22, 33/16
U.S. Cl. 23—232                    11 Claims

ABSTRACT OF THE DISCLOSURE

In a breath-type blood alcohol test in which the weight of alcohol in a given quantity of expired breath is determined, the amount of alveolar breath in the given quantity is also determined to assure that the test results are not erroneously affected by acidosis or alkalosis in a test subject.

CROSS-REFERENCE TO RELATED APPLICATION

This application is a continuation of application Ser. No. 416,540 filed Dec. 7, 1964 entitled Method and Apparatus for Determining Intoxication and now abandoned.

BACKGROUND OF THE INVENTION

Field of the invention

This invention relates to intoxication determination, and more particularly to method and apparatus for making such a determination which accurately reflects the subject's intoxication regardless of whether the subject does or does not, because of a temporary or permanent pathological or physiological condition, meet a statistical norm.

The fact that the alcohol-carbon dioxide ratio in the breath of a human may be used to determine the concentration of alcohol in the blood is now well understood by physicians and criminologists. Moreover, it is now well established that the degree of a person's intoxication can be determined by the extent to which alcohol is present in the blood. This invention provides for the determination of a person's blood alcohol content by accurately determining the ratio of alcohol to carbon dioxide in the person's breath. A determination so made does not depend upon the taking of a blood sample, nor does it require a prolonged detention of the person. The use of this invention is, therefore, not subject to the objection of unlawful detention or search or invasion of other constitutional rights. The result is that such determinations may be received as evidence in legal proceedings where an individual's degree of intoxication is in issue.

Description of the prior art

Prior methods for determining blood alcohol content via breath analysis are accurate only if the subject whose breath is tested is "normal" in the statistical sense. The air expired from the alveolae of a statistically average person contains approximately 5.6% carbon dioxide. This carbon dioxide is related to the carbon dioxide in the blood by a fixed ratio, called the partition ratio. The constant which defines this ratio is referred to as the Ostwald Partition Ratio Constant and is .000217 at 25° C. For example, 1000 milliliters of air in equilibrium with water containing 4 milligrams of alcohol per milliliter will contain, at 25° C., 1000×4×.000217 or 0.868 milligram alcohol. The same constant relates carbon dioxide and blood.

Prior breath analysis methods, therefore, involved the collection of a sample of a subject's breath. The sample of

2 expired breath was passed through suitable apparatus for a short time, say 3 or 4 minutes. The apparatus removed alcohol vapor and carbon dioxide from the breath. The weight of carbon dioxide removed was used to determine the quantity of alveolar breath which had been passed through the apparatus. The weight of alcohol vapor removed from the expired breath could then be related to blood alcohol content. Such a procedure produces an accurate determination of blood alcohol content only so long as the subject is a statistically average or normal person.

It has long been recognized that humans may suffer from acidosis or alkalosis. Acidosis is a condition wherein the pH of the blood is below normal. To correct this condition, the brain causes respiratory action to be increased relative to blood circulation to blow off more $CO_2$. In cases of alkalosis where the pH of the blood is above normal, respiration is decreased relative to blood circulation and the rate of $CO_2$ removal from the blood is reduced. Either of these conditions leads to an error in a blood alcohol determination obtained by the above-described procedure; acidosis produces an erroneously low blood alcohol determination and alkalosis produces an erroneously high determination. These errors result because there is more or less alveolar air present in the total amount of air expired per breath, and because the prior analysis methods assumed a constant percentage of alveolar air in expired air. (Expired air is a mixture of mouth air and alveolar or deep lung air.)

SUMMARY OF THE INVENTION

This invention provides an improved method for determining blood alcohol content by breath analysis. The method allows for variations in the amount of alveolar air present in expired air and thus does not give an erroneous determination because of acidosis or alkalosis. The invention also provides novel apparatus for carrying out the method.

Generally speaking, in terms of method, this invention teaches the determination of blood alcohol content in a human subject by weighing the amount of alcohol present in a selected volume of the subject's breath, and by weighing the amount of carbon dioxide present in the same volume of breath. The true amount of alveolar air present in the volume of breath is determined from the weight of carbon dioxide, and the ratio of alcohol per volume unit of blood is then found by use of the Ostwald Partition Ratio Constant.

BRIEF DESCRIPTION OF THE DRAWINGS

The above-mentioned features of the invention are more fully set forth in conjunction with the following description of novel apparatus according to the invention, which description is presented in conjunction with the accompanying drawings wherein:

FIG. 1 is a cross-sectional elevation view of breath analyzing apparatus according to this invention; and FIG. 2 is a cross-sectional elevation view of apparatus for obtaining a preliminary determination of blood alcohol content.

DESCRIPTION OF THE PREFERRED EMBODIMENT

A breath analyzing apparatus 10 includes a balloon 11, an elongated compartmented tube 12, and an inexpansible but collapsible container 13 assembled in serial order with their interiors interconnected. The balloon is equipped with a mouthpiece 14 and an outlet fitting 15. A flutter valve 16 is connected to the mouthpiece interiorly of the balloon so that breath blown into the balloon through the mouthpiece by a subject cannot escape through the mouthpiece. The outlet fitting preferably includes a tube 17 of deformable plastic material. The balloon is calibrated so that when the balloon is inflated with the subject's breath to a predetermined size, the breath in the balloon is subjected to a predetermined pressure. The balloon is manufactured so that it cannot be inflated unless a substantial lung pressure is developed by the person inflating the balloon, although the balloon has a stiffness low enough that any adult or teenager can inflate it. This stiffness of the balloon assures that alveolar air, not merely mouth air, will be used in inflating the balloon. Accordingly, the balloon is adapted to receive a mixture of mouth and alveolar air. If the person inflating the balloon is an average healthy person, approximately $21/32$ of the total volume of air present in the balloon is alveolar air.

Tube 12 is comprised of first and second containers 20 and 21. Each container has opposite externally threaded nipples 22 and 23. When the apparatus is removed from a suitable package prior to the use of the apparatus, nipple 22 of container 20 and nipple 23 of container 21 are closed by suitably threaded caps 24 and 25, respectively. Gaskets 26 and 27, respectively, assure that the closures obtained between the caps and the nipples are airtight. The containers are interconnected by a union 28 preferably made up of a pair of caps 29 and 30 which have been axially bored as at 31 and which are glued together in a coaxially aligned, back-to-back relation. Containers 20 and 21 are threaded into the union and a pair of gaskets 32 and 33 assure that the joint between the containers is airtight. When the apparatus is removed from its package, containers 20 and 21 are interconnected by union 28.

A body of granular material 35 is disposed in container 20 and is maintained in position in the container by wads of glass wool 36, or the like, disposed in the container at opposite ends of the body. Material 35 has the characteristic that it absorbs or extracts alcohol vapor and moisture from gas passed through the container. Preferably material 35 is magnesium perchlorate.

A second body of granular material 38 is disposed in container 21 and is maintained in position in the container by wads 39 of glass wool or the like disposed in the container at opposite ends of the body. Material 38 has the characteristic that it absorbs or extracts carbon dioxide from gas flowing through the container. Preferably material 38 is a material such as "Ascarite 28" which is Arthur H. Thomas & Company's tradename for sodium hydroxide on an asbestos carrier. The weight of container 21 and its contents are known.

Inexpensible container or bag 13 is provided in a collapsed state. The container has a predetermined interior volume when inflated to its opened or enlarged condition. Preferably the bag or container is manufactured of polyethylene film and thus is essentially inexpansible in that the material from which the container is made will not stretch like balloon 11. Container 13 has an inlet fitting 41 which preferably is a tube of soft plastic material communicating with the interior of the container but sealed to the walls of the container by a suitable airtight connection.

Breath analysis apparatus 10 includes a pair of adapters 45. Each adapter is essentially an internally threaded cap, such as any one of caps 24, 25, 29 and 30, which has an annularly bored nipple 46 extending away from the internally threaded portion of the cap. Each adapter has an annular bore 47 therethrough. The external surface of nipple 46 defines a cone which tapers proceeding away from the main body of the adapter. A short length of soft plastic tubing 48 is engaged at one end with the exterior of nipple 46. Tubing 48 has a slightly smaller external diameter than the external diameter of the plastic tubes of fittings 17 and 41.

Preferably cap 24 and portion 29 of union 28 have a distinctive color which is different from the color of cap 25 and union portion 30. This color coding assures that the user of apparatus 10 will interconnect the parts in the proper relationship when the apparatus is assembled just prior to the giving of a breath alcohol test.

When the apparatus is to be used to determine the breath alcohol content of a subject suspected of being intoxicated, the user of the device, who may be a police officer, assembles the components of the apparatus in the following manner. Tube 12, closed at its opposite ends by caps 24 and 25, is removed from a suitable container for the apparatus. Cap 24 is removed from the tube and one of adapters 45 is threaded on nipple 22 of container 20. Outlet fitting 17 of balloon 11 is engaged with this adapter by engaging adapter tube 48 within balloon outlet tube 17. Since these tubes are fabricated of soft plastic material, an intimate fit is maintained between the tubes so that an airtight connection is obtained. The officer then has the subject whose degree of sobriety is in question inflate balloon 11 to a predetermined size. The balloon adjacent outlet fitting 15 is then twisted to provide a temporary airtight constriction in the balloon. Cap 25 is then removed from nipple 23 of container 21 and the other one of adapters 45 is engaged in its place. Inexpansible bag 13 is then engaged with the tube by engaging plastic tubes 41 and 48 together in the same manner in which tubes 17 and 48 were engaged. When bag 13 is connected to container 21, the bag is in its collapsed condition. The officer then merely untwists the balloon so that breath contained in the balloon is caused to flow through containers 20 and 21 into bag 13, and this breath flow is continued until bag 13 is fully inflated and contains a predetermined volume of the subject's breath.

As the breath flows through the apparatus, alcohol vapor and moisture are removed from the breath in container 20. The carbon dioxide present in the breath is removed in container 21. After bag 13 has been fully expanded, adapters 45 are removed from analyzer tube 12 and caps 24 and 25 are reengaged with the tube. The tube is then transmitted to a laboratory where the weights of alcohol vapor and carbon dioxide absorbed by granular materials 35 and 38, respectively, are determined. The blood alcohol content of the subject at the time the subject filled balloon 11 with his breath may then be determined with accuracy since the volume of breath which passed through the analyzer tube is known with precision.

Preferably, the volume defined by bag 13 in its filled state is 3200 ml. In the average person 3200 ml. of expired breath contain 2100 ml. of alveolar or deep lung air. It must be borne in mind, however, that this condition will not obtain if the subject whose breath is tested suffers from alkalosis or acidosis. By knowing the amount of carbon dioxide present in a known volume of expired breath, however, the true amount of alveolar breath contained in the expired breath may be determined. Regardless of whether a person suffers from alkalosis or acidosis, human alveolar breath contains substantially 5.6% carbon dioxide. The air inhaled by a person contains .03% carbon dioxide. The average carbon dioxide content of expired air (mixture of mouth and deep lung air) contains 4.5% carbon dioxide. This corresponds to there being 2100 ml. alveolar air in 3200 ml. expired air. Mouth air, however, is essentially identical to the air inhaled by the person and, therefore, contains a very low amount of carbon dioxide. Accordingly, the carbon dioxide content of expired air is attributable to alveolar air. Therefore, if the amount of carbon dioxide present in a known quantity of expired air is known, the amount of alveolar air present in the expired air can be found with great accuracy.

Since apparatus 10 allows accurate determination of the ratio of alcohol vapor to carbon dioxide in a known quantity of alveolar air, the amount of alcohol present in the subject's blood may be determined with precision. This determination is accurate whether or not the subject suffers from alkalosis or acidosis. It is, therefore, apparent that this invention provides a much improved method for determining blood alcohol content of a human subject.

Assuming that 3200 ml. of expired breath is collected in container 13, the amount by weight of alcohol present in the blood of a test subject is determined by use of the expression $(A) \times (C/200)$ wherein A is the weight in milligrams of alcohol removed in container 20 from expired breath passing to container 13 and C is the weight in milligrams of $CO_2$ removed in container 21 from expired breath passing to container 13. If the test subject is normal (i.e., does not suffer from acidosis or alkalosis), C will equal 200 milligrams and A will be the weight of alcohol present in one ml. of the subject's blood since, for a normal person, there is 2100 ml. of alveolar breath in 3200 ml. of expired breath. If the subject suffers from acidosis, there will be a greater than normal concentration of alveolar breath in the sample of expired breath, and more than 2100 ml. of alveolar breath will be expired per ml. of blood. Thus, it is necessary to apply a correction greater than unity to the amount of alcohol sensed to accurately determine the amount of alcohol present per ml. of blood. The $(C/200)$ term, therefore, is a correction which compensates for the error otherwise produced by acidosis or alkalosis. In the case of acidosis, more $CO_2$ than 200 milligrams will be present in 3200 ml. of expired breath, and $(C/200)$ will have a value greater than unity, thereby to make the proper correction. Conversely, in the case of alkalosis, $(C/200)$ will be less than unity, and such term will adjust downward by the correct amount the otherwise erroneously high measurement of blood alcohol content produced by prior breath alcohol analysis techniques.

Prior techniques measured alcohol and $CO_2$ content, or alcohol content of a measured volume of expired breath; in the former case, $CO_2$ was measured as an alternate to the measurement of the amount of expired breath subjected to alcohol analysis. Prior techniques did not measure alcohol content, $CO_2$ content and the total volume of expired breath subjected to alcohol and $CO_2$ analysis. For example, Jetter et al. (Archives of Pathology, 32, pages 828 et seq. at 830, 1940) state that blood alcohol content is given by the expression $(A) \times (200/C)$ and that only A and C are measured. This procedure assumes that 2100 ml. of alveolar breath always corresponds to one ml. of blood. Thus, Jetter et al. use the term $(200/C)$ to determine how much blood is associated with A. In view of the foregoing, it is apparent that this expression gives an erroneously low measurement in the case of acidosis and an erroneously high measurement in the case of alkalosis.

If the actual volume of expired breath analyzed for alcohol and $CO_2$ content differs from the 3200 ml. volume assumed above, a factor of $(3200/V)$ is applied to the expression $(A) \times (C/200)$, V being the actual volume in milliliters of expired breath passed through containers 20 and 21, for example. Thus, B.A. (abs.) $= (A) \times (C/200) \times (3200/V)$ is a universally applicable expression which is not dependent upon the use of a container having a volume of 3200 ml. and which may be used effectively to obtain an accurate measurement of the amount of alcohol present in a milliliter of blood, on a weight-to-weight basis.

Since the weight of container 21 and its contents prior to the use of the apparatus is known, the amount of carbon dioxide present in the breath passed through container 21 may be determined merely by weighing tube 21 after the apparatus has been used and subtracting the original weight of the container.

Many methods may be used to determine the amount of alcohol vapor extracted from the breath by material 35. One preferred method of determining this amount is a distillation method. The material, preferably magnesium perchlorate, is dissolved in distilled water and the alcohol is distilled from the solution and weighed.

Since the apparatus described above requires a laboratory analysis of the contents of containers 20 and 21 after the apparatus has been used, the apparatus does not provide an immediate indication of the subject's sobriety. It is, therefore, preferred that the apparatus described above be used after a preliminary visual indication of the subject's sobriety has been obtained by the use of the apparatus described in my issued United States Patent 3,223,488 for Device for Alcohol Determination. FIG. 2 shows an indicator 60 for providing a visual determination of a person's blood alcohol content. Indicator 60 is described more fully in the above-identified patent. The indicator includes an elongated hollow glass tube 61 sealed at its opposite ends by removable stoppers 62. A plurality of bodies 63 of granular material are disposed in the tube and are impregnated with an alcohol sensitive indicator which chemically reacts with alcohol in breath flowing through the tube to produce a color change which progresses along the tube in the direction of breath flow through the tube. Bodies 63 are separated from one another by contrastingly colored inert bodies of a granular material 64. Bodies 63 have a predetermined length along the tube between adjacent ones of bodies 64. Bodies 63 and 64 are maintained in position in the tube by wads of glass wool 65, or the like, and retainer elements 66 in the form of polyethylene O-rings. The tube is so constructed that when expired breath is presented to the tube at a predetermined pressure, this breath flows through the tube at a predetermined rate. Preferably the expired breath is supplied from balloon 11 which is connected to the tube after stopper 62 has been removed therefrom. The lengths of bodies 63 along the tube are such that if the first body changes color, the subject has approximately .15% alcohol in his blood. Similarly, if the second body changes color, 30% of alcohol is present in the subject's blood.

By the use of indicator 60 prior to the use of apparatus 10, the police officer or other person testing the sobriety of a suspect may determine whether the more accurate determination of blood alcohol content provided by apparatus 10 is desired. If the visual indication produced by indicator 60 shows that the subject is not so intoxicated as to be amenable to legal action, a determination of blood alcohol content according to the apparatus 10 is not needed. On the other hand, if it is questionable whether the subject is legally intoxicated, then the more accurate determination provided by apparatus 10 is obtained.

The method described above is an improvement over methods heretofore practiced since it requires that the volume of breath analyzed for alcohol and carbon dioxide content be known with precision. Similarly, the apparatus described above is novel in that it provides structure for assuring that a known volume of breath is passed through the alcohol vapor and carbon dioxide removal chambers. Prior apparatus did not provide such structure and blood alcohol measurements obtained thereby were subject to error if the person whose breath was analyzed suffered from alkalosis or acidosis. This was the case since the prior devices were dependent for their accuracy on the subject being "normal."

While the invention has been described above in conjunction with specific apparatus, this has been merely by way of example for the purposes of setting forth a preferred embodiment of the present invention and is not to be considered as limiting the scope of this invention.

What is claimed is:

1. A method for determining the blood alcohol content of a human subject including the steps of
   (1) obtaining and measuring a definite volume of the subject's expired breath,
   (2) determining the weight of alcohol present in the measured volume,
   (3) determining the weight of carbon dioxide present in the measured volume,
   (4) determining the weight of carbon dioxide which would be present in the measured volume if the measured volume were obtained from a statistically average subject as the terminal portion of a prolonged breath expiration by such subject, (5) determiinng the ratio which the measured volume bears to that volume of expired breath correlatable directly to one unit volume of blood in a statistically average subject, and (6) determining the amount of alcohol present in one unit volume of the actual subject's blood by evaluating the product of (a) the weight of alcohol present in the measured volume, (b) the ratio of the weight of carbon dioxide present in the measured volume to the weight of carbon dioxide determined by performance of step (4) above, and (c) the ratio determined in performance of step (5) above.

2. A method according to claim 1 wherein the determination of weight of carbon dioxide which would be present in the measured volume if obtained from a statistically average subject is made by evaluating the relation $200 \times (V/3200)$ wherein V is the measured volume in milliliters, said determination having units of milligrams.

3. A method according to claim 1 wherein said one unit volume of blood is one milliliter and the volume of expired breath correlatable to one milliliter of blood in a statistically average subject is 3200 milliliters.

4. A method according to claim 1 wherein the weight of alcohol present in the measured volume is determined by passing the measured volume of expired breath through a body of material having the property of extracting alcohol vapor from gas flowing therethrough.

5. A method according to claim 1 wherein the weight of carbon dioxide present in the measured volume is determined by passing the measured volume of expired breath through a body of material having the property of extracting carbon dioxide from gas flowing therethrough.

6. A method according to claim 1 wherein the definite volume of expired breath is obtained from the terminal portion of a prolonged exhalation of the subject.

7. A method for determining the blood alcohol content of a human subject including the steps of (1) obtaining a definite volume V of the subject's expired breath, (2) measuring volume V in milliliters, (3) determining in milligrams the weight A of alcohol present in the measured volume, (4) determining in milligrams the weight C of carbon dioxide present in the measured volume, (5) determining the amount in milligrams of alcohol present in one milliliter of the subject's blood by evaluating the relation $(A) \times (C/200) \times (V/3200)$.

8. A method for determining the blood alcohol content of a human subject including the steps of (1) obtaining 3200 milliliters of the subject's expired breath, (2) determining the weight in milligrams of alcohol A present in said volume of expired breath, (3) determining the weight in milligrams of carbon dioxide C present in said volume of expired breath, (4) determining the amount in milligrams of alcohol present in one milliliter of the subject's blood by evaluating the relation $(A) \times (C/200)$.

9. Apparatus for determining the blood alcohol content of a human comprising a receptacle for human breath defined by a balloon which exerts a predetermined pressure on its contents when inflated to a predetermined size and which has a valved mouthpiece inlet and an outlet, a first container adapted for the flow of gas therethrough, a body of a first material disposed in the first container and having the property of extracting alcohol from gas flowing through the first container, means for connecting the first container to the balloon outlet so that the first container receives breath from the balloon, a second container adapted for the flow of gas therethrough connected to the first container to receive breath from the first container, a predetermined quantity by weight of a second material disposed in the second container and having the property of extracting carbon dioxide from gas flowing through the second container, and a gas-tight bag of inelastic material having a predetermined volume when filled connected in a collapsed state to the second container to receive breath from the second container.

10. Apparatus according to claim 9 wherein the first material is magnesium perchlorate.

11. Apparatus according to claim 9 wherein the second material includes sodium hydroxide.

References Cited

UNITED STATES PATENTS

| 2,591,691 | 4/1952 | Forrester | 23—232 |
| 2,867,511 | 1/1959 | Harger | 23—254 |

OTHER REFERENCES

Berkebile, J.M.: J. Chem. ed. 31, 380 (1954), pp. 380–382.

Jetter et al.: Arch. Path. 32, 828–842 (1941).

MORRIS O. WOLK, Primary Examiner

R. M. REESE, Assistant Examiner

U.S. Cl. X.R.

23—254